United States Patent
Algulin et al.

(10) Patent No.: US 8,464,837 B2
(45) Date of Patent: Jun. 18, 2013

(54) DEVICE AND METHOD FOR CONTROLLING SUPPLY OF LUBRICANT AT A WORK VEHICLE

(75) Inventors: Ulrik Algulin, Örebro (SE); Christer Andersson, Örebro (SE)

(73) Assignee: Atlas Copco Rock Drills AB, Orebro (SE)

(*) Notice: Subject to any disclaimer, the term of this patent is extended or adjusted under 35 U.S.C. 154(b) by 204 days.

(21) Appl. No.: 12/733,736

(22) PCT Filed: Sep. 19, 2008

(86) PCT No.: PCT/SE2008/051051
§ 371 (c)(1),
(2), (4) Date: Mar. 17, 2010

(87) PCT Pub. No.: WO2009/051550
PCT Pub. Date: Apr. 23, 2009

(65) Prior Publication Data
US 2010/0243070 A1   Sep. 30, 2010

(30) Foreign Application Priority Data
Oct. 17, 2007   (SE) ........................................ 0702312

(51) Int. Cl.
 F01M 1/00  (2006.01)
 F01M 1/18  (2006.01)
 F16N 25/00 (2006.01)
 F17D 3/00  (2006.01)
 F16K 31/48 (2006.01)

(52) U.S. Cl.
 USPC ............... 184/26; 184/6.4; 184/7.3; 137/551; 137/624.11

(58) Field of Classification Search
 USPC .................... 184/26, 10.7, 10.8, 6.4, 6.8, 7.3, 184/6; 123/196 S; 137/14, 551, 565.01, 624.11
 See application file for complete search history.

(56) References Cited

U.S. PATENT DOCUMENTS 4,445,168 A * 4/1984 Petryszyn ........................ 700/21
4,520,902 A * 6/1985 Snow .............................. 184/7.4

(Continued)

FOREIGN PATENT DOCUMENTS

CN   101033762 A   9/2007

OTHER PUBLICATIONS

Commercial Programmer Controller.*

(Continued)

Primary Examiner — William E Dondero
Assistant Examiner — Minh Truong
(74) Attorney, Agent, or Firm — Mark P. Stone

(57) ABSTRACT

The invention relates to a device for lubrication of a work vehicle, which device includes: a tank (1) for storage of lubricant; a number of delivery points (8a-g) at which lubricant is supplied to the tools of the work vehicle or other parts that need to be lubricated; a distribution block (5) including a number of branching points (6a-g) that all are connected to a delivery point (8a-g); a pump (2) for delivering lubricant from the tank (1) to the distribution block (5) and further on to the delivery points (8a-g); a control system (3), for regulating the supply of lubricant. Further the device includes: a detector (4) that detects when a volume of lubricant that corresponds to a pump cycle has been delivered from the pump and sends a signal with this information to the control system (3), a timer (11) that measures time intervals that corresponds to a certain duration of time and is adjusted to, for each time interval, send a signal to the control system (3) that indicates that a time interval has elapsed, wherein the control system by means of the signals from the detector (4) and the timer (11) regulates the pump to deliver a certain number of pump cycles per time interval to the delivery points (8a-g). The invention also relates to a method.

21 Claims, 2 Drawing Sheets

U.S. PATENT DOCUMENTS

| | | | | |
|---|---|---|---|---|
| 4,527,661 A | * | 7/1985 | Johnstone et al. | 184/6.1 |
| 4,769,978 A | * | 9/1988 | Reichen et al. | 56/12.3 |
| 5,038,893 A | * | 8/1991 | Willner et al. | 184/7.4 |
| 5,195,612 A | * | 3/1993 | Hahn et al. | 184/6.4 |
| 5,381,874 A | | 1/1995 | Hadank et al. | |
| 5,482,138 A | * | 1/1996 | Mori et al. | 184/6.4 |
| 5,823,295 A | | 10/1998 | Griffith et al. | |
| 5,934,242 A | * | 8/1999 | Anamoto | 123/196 R |
| 5,970,942 A | * | 10/1999 | Koeberlein et al. | 123/196 R |
| 5,981,874 A | | 11/1999 | Reiker | |
| 6,941,922 B2 | * | 9/2005 | Williams et al. | 123/196 R |
| 7,007,656 B2 | * | 3/2006 | Fujino | 123/196 R |
| 7,343,252 B2 | * | 3/2008 | Wiens | 702/54 |

OTHER PUBLICATIONS

WMPIII Maxi-Monitor.*
www.vogelag.com, VOGEL Centralize Lubrication Systems, Aug. 2004.*

* cited by examiner

DEVICE AND METHOD FOR CONTROLLING SUPPLY OF LUBRICANT AT A WORK VEHICLE

TECHNICAL FIELD OF THE INVENTION

The invention relates to a device and a method for controlling the supply of lubricant, in a machine, in particular a work vehicle such as a loader or a dumper.

BACKGROUND OF THE INVENTION

On a work vehicle, such as e.g. loaders or dumpers, it is important that the movable parts of the work vehicle are kept well-greased. It is not sufficient to lubricate the vehicles between operation or every now and then. Therefore, most work vehicles are furnished with more or less automatic lubrication devices, which guarantee that the different functions of the work vehicle are lubricated at predetermined intervals when the work vehicle is in operation.

In order to avoid that the lubricant runs out at any spot such lubricant devices are often programmed to lubricate continuously on even intervals throughout the whole operation time of the machine. A problem with such a continuous supply of lubricant is however that an excess of lubricant is supplied when the machine is on idle running, which may lead to important spillage if the machine remains still for a long period of time. This spillage may have serious effects on the environment, but since this spillage of lubricant does not imply any particular economic losses there has up until now not existed any incentives to develop a lubrication system that is adapted to the actual utilization of a work vehicle.

STATE OF THE ART

On a conventional device for the supply of lubricant, on which the invention is based, a timer and a pump are arranged. The pump is normally arranged to give a constant flow as long as it is active, wherein the timer is used for controlling the flow over time by activation and deactivation of the pump. A problem with such a device has been that the pump due to prevailing circumstances rarely has been able to deliver an even flow, wherein either too much or too little lubricant has been supplied. In order not to risk that the tools get too little lubricant, which could lead to that they are prematurely worn out, the timer is often programmed generously, such that too much lubricant has been supplied. As mentioned above, this leads to lubricant spillages, which are particular serious if the work vehicle remains still in neutral gear for a long period of time, as the lubricant is kept at a continuous mode even though the tools are not being used.

In the patent publication U.S. Pat. No. 5,823,295, an apparatus for lubrication of a work vehicle is described. The apparatus is furnished with a relatively advanced control system that takes a number of different parameters into consideration in order to achieve a suitable lubrication of a work vehicle. The apparatus includes a means for disconnecting the lubrication system in case of malfunction, e.g. depending on prevailing conditions. However, in spite of its complexity the described apparatus does not involve a system that may deliver a quantity of lubricant regardless of prevailing conditions, such as temperature and relative humidity, and that indicates at an early stage that something in the system does not work as intended. The quantity of lubricant supplied is regulated by controlling the pressure of the lubricant, wherein the actual quantity that is supplied may vary a lot depending on the viscosity of the fluid or depending on if a stop has occurred somewhere in the fluidal system.

SUMMARY OF THE INVENTION

The main object of the present invention is to provide a lubrication system for a work vehicle, which solves the problem described above, is reliable regardless of prevailing conditions, and which at the same time is relatively cost efficient and simple to implement.

According to a first aspect the invention relates to a device for controlling the lubrication of a work vehicle, which device includes: a tank for storing a lubricant; a number of delivery points, at which lubricant is supplied to the tools of the work vehicle or other parts need to be lubricated; a distribution block including a number of branching points that are all connected to a delivery point; a pump for pumping lubricant from the tank to the distribution block and on to the delivery points; a control system, for controlling the supply of lubricant Further, the device includes: a detector that detects when a volume of lubricant that corresponds to a pump cycle is delivered from the pump and sends a signal with this information to the control system, a timer that measures time intervals that correspond to a certain duration of time and is adjusted to, for each time interval, send a signal to the control system that indicates that a time interval has elapsed, wherein the control system, based on the signals from the detector and the timer regulates the pump to deliver a certain number of pump cycles per time interval to the delivery points.

According to a second aspect, the invention relates to a method on a work vehicle for controlling the supply of lubricant to the tools of a work vehicle or other parts that need to be lubricated, which method includes the following steps: a) pumping lubricant from a tank to a distribution block with a number of branching points, from which lubricant is transmitted to a number of delivery points at the tools of the work vehicle or other parts that need to be lubricated, b) at the distribution block, detecting a pulse indicates that a certain volume of lubricant has been transmitted to all branching points, c) sending a signal to a control system that indicates that lubricant has been transmitted to all branching points, d) measuring a duration of time that constitutes a time interval, e) sending a signal to the control system when a time interval has elapsed and the next one starts, f) defining a desired number of pulses that shall be detected within a time interval, and g1) deactivation of the pump if a desired number of pulses are detected within a time interval, or until an operator aborts the lubrication, g2) sending an error indication to a user interface if the desired number of pulses is not detected within a time interval, and h) repeating the method when next time interval starts, wherein the method is repeated as long as the work vehicle is in operation or until the lubricant is aborted via the control system.

The invention according to the aspects pointed out above solves the problems that appear in lubricant devices and methods of the prior art. Due to the fact that it is controlled that a certain volume of lubricant is supplied it is more feasible to govern the lubrication in a controlled manner. Additionally, the result of the lubrication is less dependent of outer conditions, such that the operator may be confident in that the lubrication functions regardless of the temperature. These and other aspects and advantages of the invention will be apparent from the detailed description and the accompanying drawings.

SHORT DESCRIPTION OF THE DRAWINGS

In the detailed description of the present invention reference is made to the accompanying drawings, of which:

DETAILED DESCRIPTION

Figure 1:
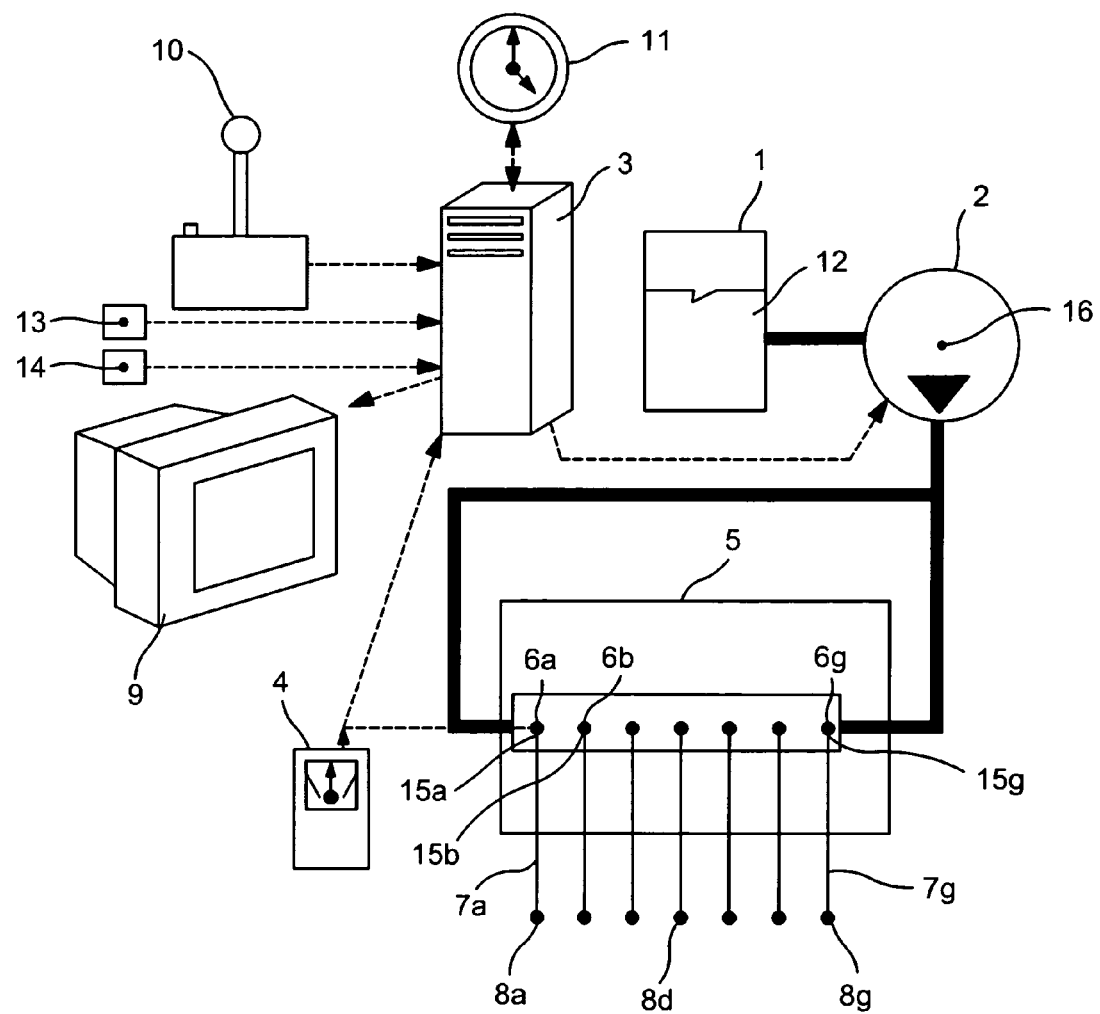
FIG. 1 shows a block diagram of the device according to the invention.

FIG. 1 shows a schematical block diagram of the device according to the invention. The device includes a tank 1 for storage of lubricant 12 and a pump 2, which e.g. may be a plunger pump that pulses out a certain volume at each stroke. Pumps for pumping lubricant are well known to a person skilled in the art, and the pump itself will not be described in detail in this application. However, in the method according to the invention, the pump is used in a partly new manner. In conventional lubrication systems, the supply of lubricant has either been controlled by letting the pump work continuously, wherein the pressure has been regulated in order to provide a desired volume of lubricant over time, or by controlling the duration that the pump is active, such that the pump, when in active mode, delivers a constant pressure.

A problem in conventional solutions is that no regard is taken to the varying viscosity of the lubricant. The viscosity differs between different types of lubricants, or greases, but above all it varies with the temperature. At high temperatures it is significantly more liquid than at temperatures down towards zero degrees Centigrade or lower. Thus, the pump works with less resistance at higher temperatures, wherein too much lubricant easily is supplied when the machine has become warm, such that accumulations of lubricant are formed, which apart from having a negative effect on the environment also may lead to slipping accidents or the like. Also, not enough lubricant has been supplied when the machine has been cold, which results in the risk that the tools of the machines may seize.

The device according to the invention, includes a control system 3, which with help of a detector 4 detects when the pump 2 has completed a cycle, i.e. when the pump has supplied a certain volume of lubricant to a distribution block 5. Additionally, a timer 11 is arranged to split up the time into time intervals. The pump 2 and the timer 11 are so arranged with respect to each other that the pump shall deliver a certain volume of lubricant within a given time interval. In the simplest embodiment, the pump is adapted to perform one pump cycle, i.e. to deliver a certain volume at each branching point 6a-g, during each time interval. By means of the control system 3 it is thus possible to decide a desired flow, i.e. a desired volume per time interval, for the pump to deliver. In conventional lubrication systems it has only been regulated how much the pump shall deliver during a certain period of time without any possibility to control the actual flow delivered by the pump.

The distribution block 5 includes a number of branching points 6a-g that all are connected via lines 7a-g to an individual delivery point 8a-g. The delivery points 8a-g constitute the end points of the lubrication system, at which lubricant is supplied to the parts of the work vehicle that need to be lubricated. The branching points 6a-g may include small plungers 15a-g that are distributed along a closed main line in the distribution block, wherein lubricant is supplied sequentially at the different branching points. It is however common that the supply at the branching points 6a-g is delivered simultaneously, and the invention also involves such systems.

Preferably, the plungers 15a-g are governed by the pressure of the lubricant achieved by the pump 2 up streams in the line, whereby no electrical equipment is needed at the individual branching points 6a-g for the supply of lubricant. The distribution block 5 itself is of a type that is known to the skilled person and is therefore not described in detail in this application. What is novel in the device according to the invention is however that a detector 4 is arranged on the distribution block 5, which detects when lubricant has been distributed at all branching points, i.e. when a pump cycle has been concluded. It is also possible to install a detector at each branching point, in order to a ascertain if there is something wrong at a certain delivery point. However, such error messages are in most cases redundant since the operator, once an error at the distribution block is noted, relatively easily may locate the actual whereabouts of the error.

Thus, the shown embodiment of the device according to the invention includes only one detector 4 at the distribution block 5, which detects when lubricant has been distributed at one of the branching points 6a-g, and when the lubricant is supplied sequentially to the branching points, the lubricant must be supplied to all branching points before the same branching point is fed again. In this manner it is easily detected in a simply way that a pump cycle has been concluded. The fact that the detection is done so far down stream in the system implies that all flow stops arising at or up stream of the distribution block 5 yields an error message. If any of the plungers in the distribution block 5 is blocked, a pressure control valve 16 at the pump 2 is opened and an error message will be sent to a user interface 9, as soon as the control system 3 by means of signals from the timer 11 and the detector 4 has been notified that the lubricant has not been supplied as intended. On the other hand, there is no control of the flow down streams of the distribution block 5, i.e. between the branching points 6a-g and the delivery points 8a-g. Namely, it is considered redundant to locate a detector at each delivery point 8a-g and chances are that the operator receives too many more or less important error messages, of which some would probably be false. Also, if leakage arises down stream of the distribution block, it may only result in minor leaks, since the flow is spread over a number of lines 7a-g.

According to yet another aspect of the invention it is possible to adjust the device such that a certain flow is used at a certain type of operational condition. In the most simplex dividing up of operational condition three types may be defined:

1. Ignition is on, but the engine is not running.
2. The engine is running, but not in gear.
3. The engine is running, and in gear, i.e. the vehicle is in operation.
4. The vehicle is in operation and links/tools are frequently used.

For these four types of operational condition, there are different needs for lubrication. In the first operational condition, at which only the electronics of the machines is turned on, the tools do not have to be lubricated at all. In the second operational condition, at which the engine is running on idle and the machine is not moving, there may exist a certain limited need to lubricate the tools of the vehicle. Normally, it is however desired that no lubrication is supplied in this operational condition either. Thus, it is possible to define these two operational conditions as one and the same operational condition. In the third operational condition, the vehicle is in gear and is moving, wherein its tools such as e.g. ladle or wagon-bridge is in use, such that the need for lubrication is big. Further, a fourth operational condition may be defined. In the forth operational condition, the vehicle is in gear, but in addition a detector is arranged to recognise if the tools of the vehicle are being used more than what is considered normal.

An advantage of the invention is that it despite its relative complexity, it is relatively easy to implement on a modern work vehicle. On work vehicles of today, the active operational condition is already known, since the vehicle is controlled via a control system 3, in which substantially all of the functions of the vehicle are registered. The operator uses the control system 3, to control the actual work vehicle and its tools. Normally, there is one or several joysticks or control units 10 arranged, by means of which the operator may manoeuvre both the vehicle and its functions. The control units 10 are connected to the control system 3 and the connection between the control system and the different functions of the vehicle preferable consist of electrical lines, which transmit electronic signals that govern the functions of the vehicle. Due to these nowadays common control systems, it is continuously registered if the vehicle is in gear or not and in which position the tools of the work vehicles are located. For example, a second detector (13) is arranged to detect if the vehicle is in gear and if the wagon-bridge is in a tilted position or not, and a third detector (14) is arranged to detect alterations to the position of the tools. These detectors are arranged in order to detect possible problems and warn the operator if he e.g. tries to move the vehicle when the wagon-bridge is tilted. In accordance with the invention, this available information is now used to control the lubrication in a cost efficient fashion and in a convenient manner for the operator.

In conventional control systems for lubrication on a work vehicle it has not been possible to determine a certain degree of lubrication to be used when the machine is in motion. Instead a certain flow of lubricant has been distributed as soon as the ignition of the vehicle has been turned on. Thus, the lubrication has been the same regardless of if the vehicle is in use or not. In certain applications, e.g. for dumpers in narrow mine gallery, the work vehicle is often inoperative waiting for the passage to clear in order to make its way forward. On such occasions ignition is turned on and normally the engine is running, but the gear box is in neutral (or parking) position, wherein the lubricant conventionally has been supplied despite that the need for lubrication has been limited. However, with the lubrication system according to the invention it is possible to minimise the spillage at an inoperative condition due to that the lubricant may be reduced or completely halted if no gear is registered.

Figure 2:
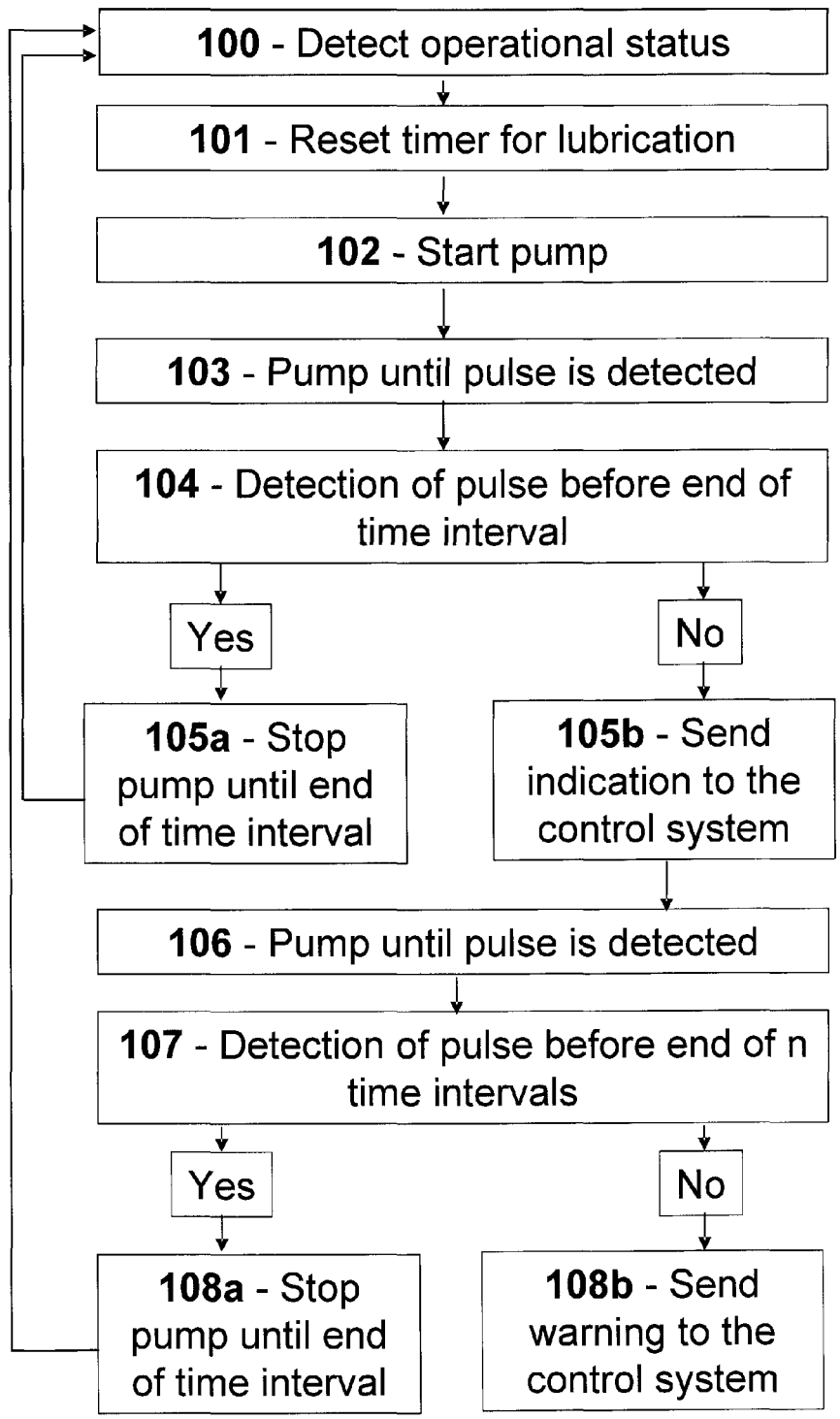
FIG. 2 shows an algorithm of the method according to the invention.

In FIG. 2 an algorithm of the method according to the invention as shown. The algorithm may look the same regardless of which of the above defined operational conditions the work vehicle is in. On the other hand, it is possible to regulate the pump via the control system such that no, or a smaller quantity of, lubricant is supplied when no gear is registered, i.e. when the engine is either not running or when it is running on idle. However, above all, the algorithm reflects the course of events when the motor is in gear, i.e. at operational conditions 3 and 4. A main object of the method according to the invention is to distribute the flow, i.e. volume per unit of time, of lubricant that is needed in a certain operational condition. In short, this is achieved by letting a pump deliver out a predetermined volume for a predetermined time interval, i.e. a predetermined period of time. If the pump pumps quicker than the desired flow, i.e. if the predetermined volume is distributed quicker than during the predetermined period of time, the pump will have to reset until the whole period of time has elapsed. An advantage this process is that it is fully automatic, wherein the operator does not need to do anything except if he notices that something is not functioning as desired.

In a first step [100] of the method, the control system detects which operational condition the vehicle is in. If the vehicle is in one of the operational conditions 1 or 2, no lubrication is normally needed, and the algorithm may be interrupted already at this point. If it, on the other hand, is in one of the operational conditions 3 or 4, lubrication is necessary why and the algorithm proceeds according to the plans. In a second step [101], a timer 11 is reset in order to control the time duration. Simultaneously or shortly after that the timer has been reset, the pump is started [102]. In the third operational condition, when the engine is running in gear and the need for lubrication is relatively important, each time interval may be e.g. 3 min and within each time interval shall e.g. one pump cycle, which corresponds to the supply of a predetermined volume, be executed. In normal conditions it may take approximately 1 min to execute a pump cycle. Thus, the pump may, after having executed a pump cycle, be inactive for 2 minutes in each time interval. However, how long a time the pump is active and inactive depends on several different parameters, such as the capacity of the pump, the need of lubricant and which operational condition the vehicle is in. It may be advantageous to use as short time intervals as possible within which a few number of pump cycles shall be executed instead of long time intervals within which a large quantity of pump cycles shall be executed, since this yields better possibilities of controlling and a more even supply of lubricant over time.

As mentioned above, a detector is arranged at the distribution block to transmit a signal to the control system when it has detected that a pump cycle has been executed [103]. Subsequently, the control system gives different commands depending on if time is left in the current time interval or not [104]. If the pulse is detected before the time interval is over, it may be concluded that the predetermined quantity of lubricant has been distributed within its time interval, and the pump is deactivated until the next time interval commences [105a]. Thus, the volume supply of lubricant is supplied by letting the pump be active for a certain duration of time and not, as in conventional methods, by adjusting the pump to deliver a certain pressure. An advantage of this is, which is mentioned above, that a certain volume is distributed regardless of the type of lubricant and regardless of its current viscosity.

If, on the other hand, no pulse is detected before the time interval has elapsed, the control system sends an indication to the user interface 9, i.e. the operator display [105b]. When an indication is sent it is first of all intended to direct the operators attention to the fact that the lubrication is slower than desired. In such a situation actions are nevertheless rarely called for. Namely, it is not uncommon that the lubrication is somewhat retarded at times, especially before the engine has warmed up sufficiently and the lubricant has become warm, wherein the inertia of lubricant forces the pump to work slower than desired. It is possible to adjust the duration of the time intervals so as to include a margin with respect to normal pump capacity such that the pump will be able to deliver the desired volume within the time interval even when the engine is cold. Having made such an adjustment it is thus rare that any error messages arise. In case no pulse is detected within the given time interval, the pump is kept active without interruption into next time interval [106], and if no pulse is detected within a certain predetermined number n of time intervals [107] a more severe warning will be sent [108b], since in such a case, it is apparent that something is seriously wrong with the pump or the distribution block. In a typical situation a total number of 6 time intervals without pulse may pass before this severe warning is sent. The operator will then be requested to return the work vehicle for maintenance. If, on the other hand, a pulse is detected before n number of time intervals has elapsed, the algorithm continues as if the pulse was detected in time, i.e. the algorithm will once again be effected from the start [100].

Above, an embodiment of the invention has been described. However, the invention may be designed in a great number of ways and is only limited by the scope of the claims below.

The invention claimed is:

1. A device for controlling the lubrication of a work vehicle, which device includes:
   a tank (1) for storing a lubricant (12);
   a number of delivery points (8a-g), at which lubricant is supplied to tools of the work vehicle or other parts that need to be lubricated;
   a distribution block (5) including a number of branching points (6a-g) that are connected to said delivery points (8a-g), respectively;
   a pump (2) for pumping lubricant from the tank (1) to the distribution block (5), said distribution block (5) transferring said lubricant to the delivery points (8a-g);
   a control system (3), for controlling the supply of lubricant, wherein the device also includes:
   a detector (4) that detects or measures when a predetermined volume of lubricant that corresponds to a pump cycle is delivered from the pump and sends a signal with this information to the control system (3),
   a timer (11) that measures time intervals that correspond to a certain duration of time and is adjusted to, for each time interval, send a signal to the control system (3) that indicates that a time interval has elapsed, wherein the control system, based on the signals from the detector (4) and the timer (11), regulates the pump to deliver a certain number of pump cycles per time interval to the delivery points (8a-g).

2. Device according to claim 1, wherein the distribution block (5) is such arranged that lubricant is supplied in portions, sequentially or simultaneously, at the different branching points (6a-g), wherein a pump cycle relates to a lapse during which a portion of said lubricant is distributed at each branching point (6a-g), and the detector is arranged to detect when lubricant has been distributed at each branching point.

3. Device according to claim 2, wherein each branching point includes a plunger, and said plungers are moved sequentially in order to portion a certain quantity of lubricant during each pump cycle and that the detector is arranged to detect accomplished movement for one of these plungers, wherein the control system regulates the pump such that said pump is deactivated when it has delivered the predetermined number of pump cycles within a time interval, and is activated when the control system (3) has received the signal from the timer (11) that a new time interval has started.

4. Device according to claim 3, wherein a user interface (9) is connected to the control system (3), wherein an error indication is sent from the control system (3) to the user interface (9) in case the detector (4) has not sent a signal that the pump (2) has delivered the predetermined quantity of lubricant during a time interval.

5. Device according to claim 3, wherein a second detector is arranged at a gear box of the work vehicle, which is arranged to detect if the work vehicle is in gear and signal this to the control system, wherein the control system, when the gear box is not in gear, regulates the pump (2) to pump less lubricant per unit of time, either by reducing the number of pump cycles per time interval, or by prolonging the duration of the time intervals, until the second detector detects that the engine is running and in gear.

6. Device according to claim 3, wherein a third detector is arranged at the tools of the work vehicle, which is arranged to detect alterations of the tools' position and signal this to the control system, wherein the control system, when the tools' position is altered more often than a predetermined value, regulates the pump (2) to deliver more lubricant per unit of time, either by increasing the number of pump cycles per time interval, or by shortening the length of the time intervals.

7. Device according to claim 2, wherein a user interface (9) is connected to the control system (3), wherein an error indication is sent from the control system (3) to the user interface (9) in case the detector (4) has not sent a signal that the pump (2) has delivered the predetermined quantity of lubricant during a time interval.

8. Device according to claim 2, wherein a second detector is arranged at a gear box of the work vehicle, which is arranged to detect if the work vehicle is in gear and signal this to the control system, wherein the control system, when the gear box is not in gear, regulates the pump (2) to pump less lubricant per unit of time, either by reducing the number of pump cycles per time interval, or by prolonging the duration of the time intervals, until the second detector detects that the engine is running and in gear.

9. Device according to claim 2, wherein a third detector is arranged at the tools of the work vehicle, which is arranged to detect alterations of the tools' position and signal this to the control system, wherein the control system, when the tools' position is altered more often than a predetermined value, regulates the pump (2) to deliver more lubricant per unit of time, either by increasing the number of pump cycles per time interval, or by shortening the length of the time intervals.

10. Device according to claim 1, wherein a user interface (9) is connected to the control system (3), wherein an error indication is sent from the control system (3) to the user interface (9) in case the detector (4) has not sent said signal that the pump (2) has delivered said volume of lubricant corresponding to a pump cycle during said time interval.

11. Device according to claim 10, wherein a pressure control valve at the pump is opened if a blockage arises at or up stream of any of the branching points, wherein the detector in such cases will not detect any signal for accomplished pump cycle, and wherein an error indication is sent from the control system (3) to the user interface (9) when a time interval has elapsed.

12. Device according to claim 11, wherein a third detector is arranged at the tools of the work vehicle, which is arranged to detect alterations of the tools' position and signal this to the control system, wherein the control system, when the tools' position is altered more often than a predetermined value, regulates the pump (2) to deliver more lubricant per unit of time, either by increasing the number of pump cycles per time interval, or by shortening the length of the time intervals.

13. Device according to claim 10, wherein a second detector is arranged at a gear box of the work vehicle, which is arranged to detect if the work vehicle is in gear and signal this to the control system, wherein the control system, when the gear box is not in gear, regulates the pump (2) to pump less lubricant per unit of time, either by reducing the number of pump cycles per time interval, or by prolonging the duration of the time intervals, until the second detector detects that the engine is running and in gear.

14. Device according to claim 10, wherein a third detector is arranged at the tools of the work vehicle, which is arranged to detect alterations of the tools' position and signal this to the control system, wherein the control system, when the tools' position is altered more often than a predetermined value, regulates the pump (2) to deliver more lubricant per unit of time, either by increasing the number of pump cycles per time interval, or by shortening the length of the time intervals.

15. Device according to claim 1, wherein a second detector is arranged at a gear box of the work vehicle, said second detector being arranged to detect if the work vehicle is in gear and signal this to the control system, wherein the control system, when the gear box is not in gear, regulates the pump (2) to pump less lubricant per unit of time, either by reducing the number of pump cycles per time interval, or by prolonging the duration of the time intervals, until the second detector detects that the engine is running and in gear.

16. Device according to claim 15, wherein a third detector is arranged at the tools of the work vehicle, which is arranged to detect alterations of the tools' position and signal this to the control system, wherein the control system, when the tools' position is altered more often than a predetermined value, regulates the pump (2) to deliver more lubricant per unit of time, either by increasing the number of pump cycles per time interval, or by shortening the length of the time intervals.

17. Device according to claim 1, wherein a third detector is arranged at the tools of the work vehicle, said third detector being arranged to detect alterations of the tools' position and signal this to the control system, wherein the control system, when the tools' position is altered more often than a predetermined value, regulates the pump (2) to deliver more lubricant per unit of time, either by increasing the number of pump cycles per time interval, or by shortening the length of the time intervals.

18. The device according to claim 1, wherein said device includes only a single detector (4) for detecting or measuring said predetermined volume of lubricant.

19. Method on a work vehicle for controlling the supply of lubricant to tools of a work vehicle or other parts that need to be lubricated, wherein said method includes the following steps:
 a) pumping lubricant from a tank to a distribution block with a number of branching points, from which lubricant is transmitted to a number of delivery points at the tools of the work vehicle or other parts that need to be lubricated,
 b) at the distribution block, detecting or measuring a predetermined volume of lubricant that has been transmitted to all branching points,
 c) sending a signal to a control system that indicates that lubricant has been transmitted to all branching points,
 d) measuring a duration of time that constitutes a time interval,
 e) sending a signal to the control system when said time interval has elapsed and the next one starts,
 f) defining a desired number of pulses that shall be detected within said time interval, and
 g1) deactivation of the pump if a desired number of pulses are detected within said time interval, or until an operator aborts the lubrication,
 g2) sending an error indication to a user interface if the desired number of pulses is not detected within said time interval, and
 h) repeating the method when the next time interval starts, wherein the method is repeated as long as the work vehicle is in operation or until the lubrication is aborted via the control system.

20. Method according to claim 19, including the step of controlling the operational condition which the work vehicle is in, said operational condition including:
 a first operational condition in which ignition is on, but the engine is not running,
 a second operational condition when the engine is running, but not in gear,
 and a third operational condition in which the engine is running and in gear, wherein no or only a small quantity of lubricant is supplied when the work vehicle is in any of the two first operational conditions, and wherein more lubricant is supplied per unit of time when the work vehicle is in the third operational condition.

21. Method according to claim 20, wherein a detector is arranged on the tools of the work vehicle such that a fourth operational condition is defined, in which the engine is running and in gear, and in which the tool is being used more often than a certain guideline value, wherein more lubricant is supplied per unit of time when the work vehicle is in the fourth operational condition than when the work vehicle is in the third operational condition, by means of which the number of desired cycles in a certain time interval is greater, or by means of which the number of desired cycles in a time interval is kept constant while the duration of the time interval is shortened.

* * * * *

UNITED STATES PATENT AND TRADEMARK OFFICE
CERTIFICATE OF CORRECTION

PATENT NO. : 8,464,837 B2
APPLICATION NO. : 12/733736
DATED : June 18, 2013
INVENTOR(S) : Ulrik Algulin and Christer Andersson Page 1 of 1

It is certified that error appears in the above-identified patent and that said Letters Patent is hereby corrected as shown below:

In the Specification

Column 4, Line 25: After "plungers", add --15a-g--.

Signed and Sealed this
Sixth Day of August, 2013

Teresa Stanek Rea
*Acting Director of the United States Patent and Trademark Office*